United States Patent
Kaida (10) Patent No.: US 10,419,675 B2
(45) Date of Patent: Sep. 17, 2019

(54) IMAGE PICKUP APPARATUS FOR DETECTING A MOVING AMOUNT OF ONE OF A MAIN SUBJECT AND A BACKGROUND, AND RELATED METHOD AND STORAGE MEDIUM

(71) Applicant: CANON KABUSHIKI KAISHA, Tokyo (JP)

(72) Inventor: Hironori Kaida, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 249 days.

(21) Appl. No.: 15/348,115

(22) Filed: Nov. 10, 2016

(65) Prior Publication Data
US 2017/0150054 A1    May 25, 2017

(30) Foreign Application Priority Data
Nov. 25, 2015   (JP) ................................ 2015-229746

(51) Int. Cl.
*H04N 5/232*   (2006.01)
*G06K 9/46*    (2006.01)
(Continued)

(52) U.S. Cl.
CPC ....... *H04N 5/23277* (2013.01); *G06K 9/4609* (2013.01); *G06T 3/0068* (2013.01);
(Continued)

(58) Field of Classification Search
CPC combination set(s) only.
See application file for complete search history.

(56) References Cited

U.S. PATENT DOCUMENTS 8,890,971 B2 * 11/2014 Nakashima ............ H04N 5/225
                                                              348/222.1
9,432,575 B2    8/2016 Kuchiki
(Continued)

FOREIGN PATENT DOCUMENTS

| JP | H06-261309 A | 9/1994 |
| JP | 2006-165600 A | 6/2006 |

(Continued)

OTHER PUBLICATIONS

Office Action dated Jun. 25, 2019, issued in corresponding Japanese Patent Application No. 2015-229746.

*Primary Examiner* — Janese Duley
(74) *Attorney, Agent, or Firm* — Venable LLP (57) ABSTRACT

An image pickup apparatus includes an image pickup sensor, at least one memory that stores instructions, and at least one processor in communication with the at least one memory and configured to execute the instructions to detect motion information of the image pickup sensor when a plurality of images is continuously shot while the image pickup sensor is being moved in a predetermined direction, to calculate a motion vector indicating a moving amount of a subject between the plurality of images shot by the image pickup sensor, by changing a search position for calculating the motion vector from a default setting value based on the motion information of the image pickup sensor, and to align and to synthesize the plurality of shot images to thereby generate a composite image based on the motion vectors.

18 Claims, 9 Drawing Sheets

(51) Int. Cl.
*G06T 3/00* (2006.01)
*G06T 11/60* (2006.01)
*G06T 3/40* (2006.01)
*H04N 5/369* (2011.01)

(52) U.S. Cl.
CPC ............ *G06T 3/4038* (2013.01); *G06T 11/60* (2013.01); *H04N 5/23238* (2013.01); *H04N 5/23254* (2013.01); *H04N 5/23258* (2013.01); *G06T 2207/20221* (2013.01); *H04N 5/369* (2013.01)

(56) References Cited

U.S. PATENT DOCUMENTS

| | | | |
|---|---|---|---|
| 9,544,616 B2 | 1/2017 | Kuwata | |
| 2015/0002684 A1* | 1/2015 | Kuchiki | H04N 5/23232 |
| | | | 348/208.4 |

FOREIGN PATENT DOCUMENTS

| | | |
|---|---|---|
| JP | 2009-053786 A | 3/2009 |
| JP | 2012-018328 A | 1/2012 |
| JP | 2013-165485 A | 8/2013 |
| JP | 2014-176034 A | 9/2014 |
| JP | 2015-012481 A | 1/2015 |

* cited by examiner

LOW ANGULAR VELOCITY AND STABLE PANNING STATE

FIG. 5B

HIGH ANGULAR VELOCITY AND STABLE PANNING STATE

IMAGE PICKUP APPARATUS FOR DETECTING A MOVING AMOUNT OF ONE OF A MAIN SUBJECT AND A BACKGROUND, AND RELATED METHOD AND STORAGE MEDIUM

This application claims the benefit of Japanese Patent Application No. 2015-229746, filed on Nov. 25, 2015, which is hereby incorporated by reference herein in its entirety.

BACKGROUND OF THE INVENTION

Field of the Invention

The present invention relates to an image pickup apparatus, a method for controlling the image pickup apparatus, and a storage medium, and particularly, the present invention relates to an image pickup apparatus for detecting a moving amount of a main subject or a background, a method for controlling the image pickup apparatus, and a storage medium.

Description of the Related Art

When an image pickup apparatus is panned to perform shooting, image processing of detecting a moving amount of a subject between a plurality of resultant image frames is performed to thereby generate a composite wide-angle view. As a method for detecting the moving amount of a subject between image frames, there is a method of using information on motion of the image pickup apparatus of a gyro sensor or acceleration sensor (see Japanese Laid-Open Patent Publication (kokai) No. H06-261309). Further, there is proposed a technique for changing a search range for detecting motion between image frames by use of information on a magnitude of motion of the image pickup apparatus (see Japanese Laid-Open Patent Publication (kokai) No. 2013-165485).

With the conventional technique, however, when information on the motion of the image pickup apparatus is not correctly measured due to heat generated in the image pickup apparatus or operations of the image pickup apparatus, there is a problem that a correct moving amount cannot be detected between image frames and an unnatural composite image is consequently generated.

SUMMARY OF THE INVENTION

The present invention provides an image pickup apparatus capable of accurately detecting a moving amount of the image pickup apparatus to thereby synthesize images, a method for controlling the image pickup apparatus, and a storage medium.

Accordingly, in one aspect the present invention provides an image pickup apparatus comprising an image pickup unit, a detection unit configured to detect motion information of the image pickup unit when a plurality of images is continuously shot while the image pickup unit is being moved in a predetermined direction, a calculation unit configured to calculate a motion vector indicating a moving amount of a subject between the plurality of images shot by the image pickup unit, and a synthesizing unit configured to align and to synthesize the plurality of shot images to thereby generate a composite image based on the motion vectors calculated by the calculation unit, wherein the calculation unit changes at least either a search position or a search range for calculating the motion vector from a default setting value based on the motion information of the image pickup unit detected by the detection unit, thereby calculating the motion vector.

According to the present invention, even when information on motion of the image pickup apparatus cannot be correctly detected, it is possible to detect a correct moving amount between image frames to thereby generate a natural composite image.

Further features of the present invention will become apparent from the following description of exemplary embodiments (with reference to the attached drawings).

DESCRIPTION OF THE EMBODIMENTS

The present invention will now be described in detail with reference to the drawings showing an embodiment thereof.

Figure 1:
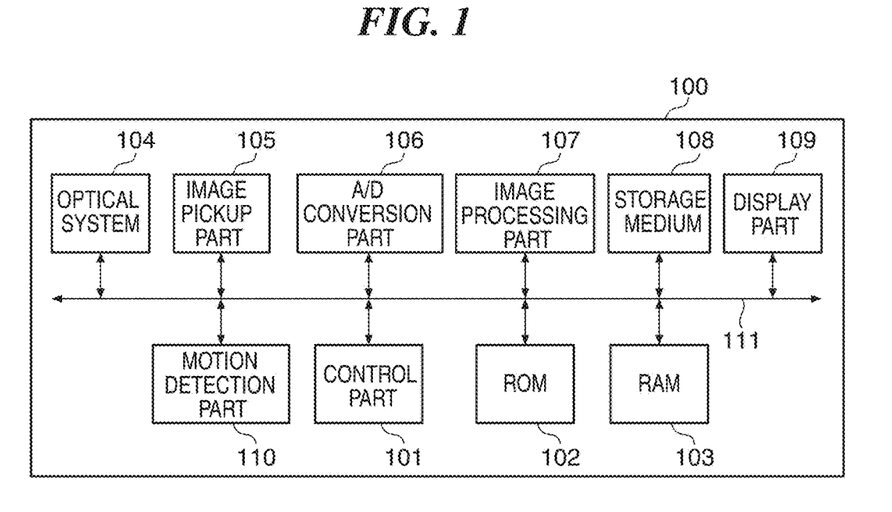
FIG. 1 is a block diagram showing a schematic configuration of a digital camera as an exemplary image pickup apparatus according to an embodiment of the present invention.

FIG. 1 is a block diagram showing a schematic configuration of a digital camera 100 as an exemplary image pickup apparatus according to an embodiment of the present invention. The digital camera 100 has a control part 101, a read only memory (ROM) 102, a random-access memory (RAM) 103, an optical system 104, an image pickup part 105, an analog/digital (A/D) conversion part 106, an image processing part 107, a storage medium 108, a display part 109, and a motion detection part 110, all of which are communicably connected via a bus 111.

The ROM 102 is a rewritable nonvolatile memory, and stores the operation programs of each block configuring the digital camera 100, and parameters required for the operations of each block. The control part 101 has a central processing unit (CPU), reads operation programs of each block configuring the digital camera 100 from the ROM 102, develops the operation programs into the RAM 103 to thereby control operations of each block, and entirely controls the digital camera 100. The RAM 103 is a rewritable volatile memory, and temporarily stores data output in the operations of each block configuring the digital camera 100. Further, the RAM 103 has a work area in which the CPU of the control part 101 develops the operation programs.

The optical system 104 has a group of lenses, such as a focus lens and a zoom lens, a diaphragm, and the like, and forms a subject image (optical image) in the image pickup part 105. The image pickup part 105 is an image pickup device for converting the optical image formed via the optical system 104 into an analog electrical signal by photoelectric conversion, which is specifically a charge-coupled device (CCD) sensor, a complementary metal-oxide semiconductor (CMOS) sensor, or the like. The A/D conversion part 106 performs A/D conversion for converting the analog electrical signal input from the image pickup part 105 into image data as a digital signal, and outputs and stores the generated image data into the RAM 103.

The image processing part 107 performs various types of image processing, such as white balance (WB) adjustment, color interpolation, and filtering, on the image data stored in the RAM 103. Characteristic processing performed by the image processing part 107 according to the present embodiment will be described below. The storage medium 108 is a memory card, or the like, attachable to and detachable from the main body of the digital camera 100, saves various items of image data stored in the RAM 103, and supplies the saved image data to the RAM 103. The display part 109 includes a display device, such as a liquid crystal display (LCD). It should be noted that the image pickup part 105, the image processing part 107, and the RAM 103 cooperate so that so called through display (live view display) can be conducted on the display part 109.

The motion detection part 110 has a gyro sensor, or the like, and detects a moving amount of the digital camera 100 (that will be denoted as "camera motion information" below). Specifically, an angular velocity and an angular acceleration in each of a yaw direction and a pitch direction based on a change in angle per unit time of the digital camera 100 are detected as camera motion information.

The characteristic image processing of the image processing part 107 will be described below. Herein, there will be assumed an example in which shooting is performed while the digital camera 100 is being panned according to motion of a main subject, thereby generating an image (panning shot image) having an effect that the main subject stops moving and the background is panned.

Figure 2A:
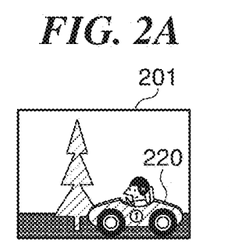
FIGS. 2A to 2E are diagrams showing exemplary images obtained by continuous shooting while the digital camera shown in FIG. 1 is being panned, and an exemplary panning shot image of composite images.
Figure 2B:
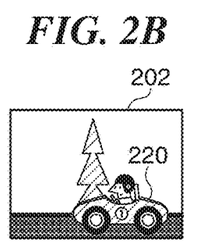
Figure 2C:
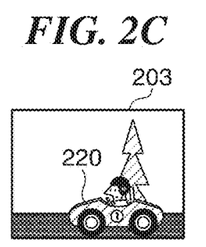
Figure 2D:
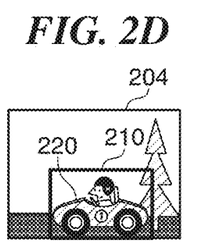
Figure 2E:
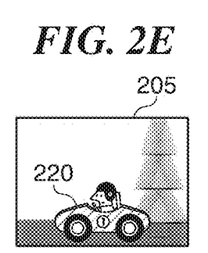

FIGS. 2A to 2C are diagrams showing the exemplary images 201, 202, and 203 obtained by continuous shooting while the digital camera 100 is being panned, respectively. Further, FIG. 2E is a diagram showing an exemplary composite image (panning shot image) 205 in which the images of FIGS. 2A to 2D are synthesized.

The images 201 to 203 of FIGS. 2A to 2C are used for detecting the panning operation of the digital camera 100. Further, a main subject area 210 including a main subject 220 (a vehicle and a driver, herein) is specified from the image 204 of FIG. 2D. The images 201 to 204 are then used to perform the image processing of panning a background image with the area other than the main subject 220 as background. By this arrangement, it is possible to generate the composite image 205 (panning shot image) shown in FIG. 2E in which only the main subject 220 stops and the background is panned. The image processing part 107 generates the composite image 205 under control of the control part 101.

Figure 3:
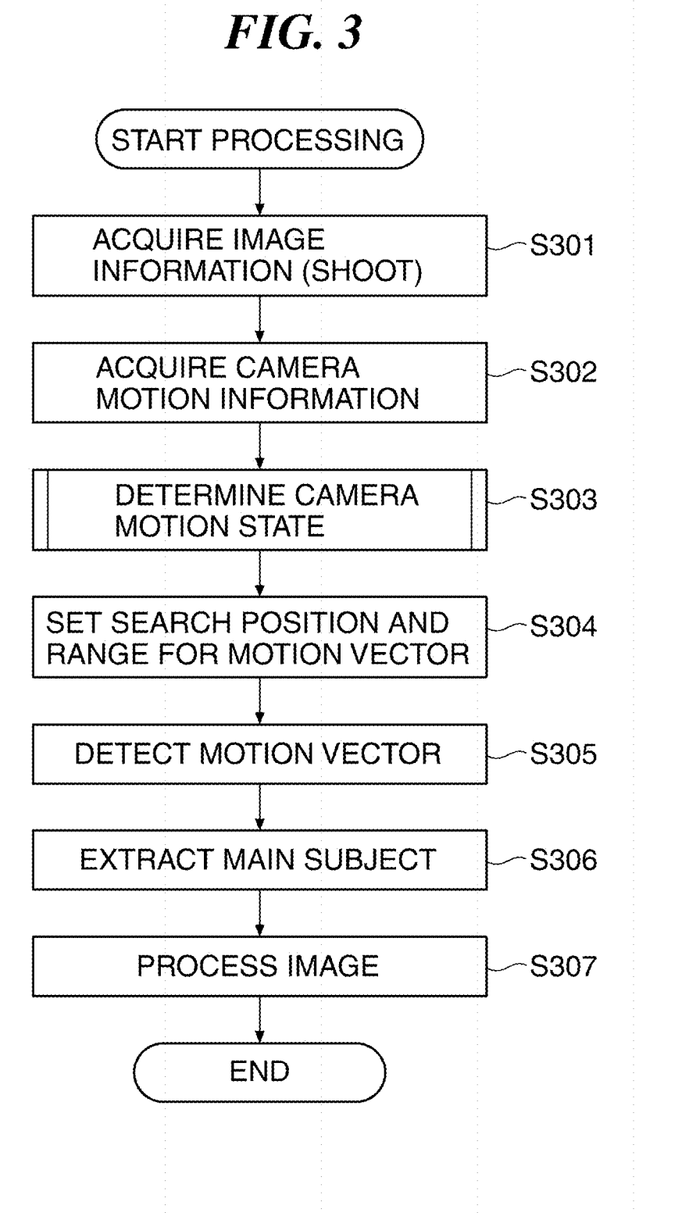
FIG. 3 is a flowchart of panning shot image synthesizing processing by the digital camera shown in FIG. 1.

FIG. 3 is a flowchart of the panning shot image synthesizing processing by the digital camera 100. The control part 101 develops a predetermined program read from the ROM 102 into the RAM 103 to control the operations or processing of each part configuring the digital camera 100 so that the processing in each step in FIG. 3 is realized.

In step S301, the control part 101 acquires image information. Specifically, in step S301, the image pickup part 105 acquires (shoots) a plurality of temporally-continuous images while the digital camera 100 is being panned under control of the control part 101. In step S302, the control part 101 acquires camera motion information during the panning of the digital camera 100 from the motion detection part 110. That is, during the shooting in step S301, the motion detection part 110 detects motion in each of the yaw direction and the pitch direction as the camera motion information.

In step S303, the control part 101 performs motion state determination processing of determining a motion state of the digital camera 100 based on the camera motion information acquired in step S302. In the motion state determination processing in step S303, a determination is made as to whether the camera motion information output from the motion detection part 110 meets a predetermined accuracy. It should be noted that the motion state determination processing will be described below in detail.

In step S304, the control part 101 sets a search position and a search range for the motion vector between the images shot in step S301. At this time, on the basis of the determination result in the motion state determination processing in step S303, the control part 101 changes a method for setting a search position and a search range for the motion vector. It should be noted that the processing in step S304 will be described below in detail.

In step S305, the control part 101 searches a motion vector in the search position and the search range for the motion vector set in step S304, thereby detecting a motion vector. For example, a motion vector between the images 203 and 204 of FIGS. 2C and 2D is detected. A typical method, such as a template matching system, can be employed for detecting a motion vector. In the template matching system, a template in a predetermined range is created to compare a reference image with an image of interest (vector detection image) for an offset therebetween, and a position with the lowest comparison value is detected as a motion vector.

Subsequently, in step S306, the control part 101 determines a motion vector similar to the camera motion information detected in step S302 as background area for the motion vector detected in step S305, and determines other vectors as a main subject area. In this way, the main subject area is separated and extracted from the background area.

In step S307, the control part 101 performs the image processing including blur processing on a background area determined in step S306, thereby generating a composite panning shot image. As a method for performing the blur processing on the background area, there can be employed a well-known method for performing filtering processing with directivity in the panning direction of the digital camera 100 (for example, the technique described in Japanese Laid-Open Patent Publication (kokai) No. 2006-165600). When the processing in step S307 ends, the present processing ends.

Figure 4:
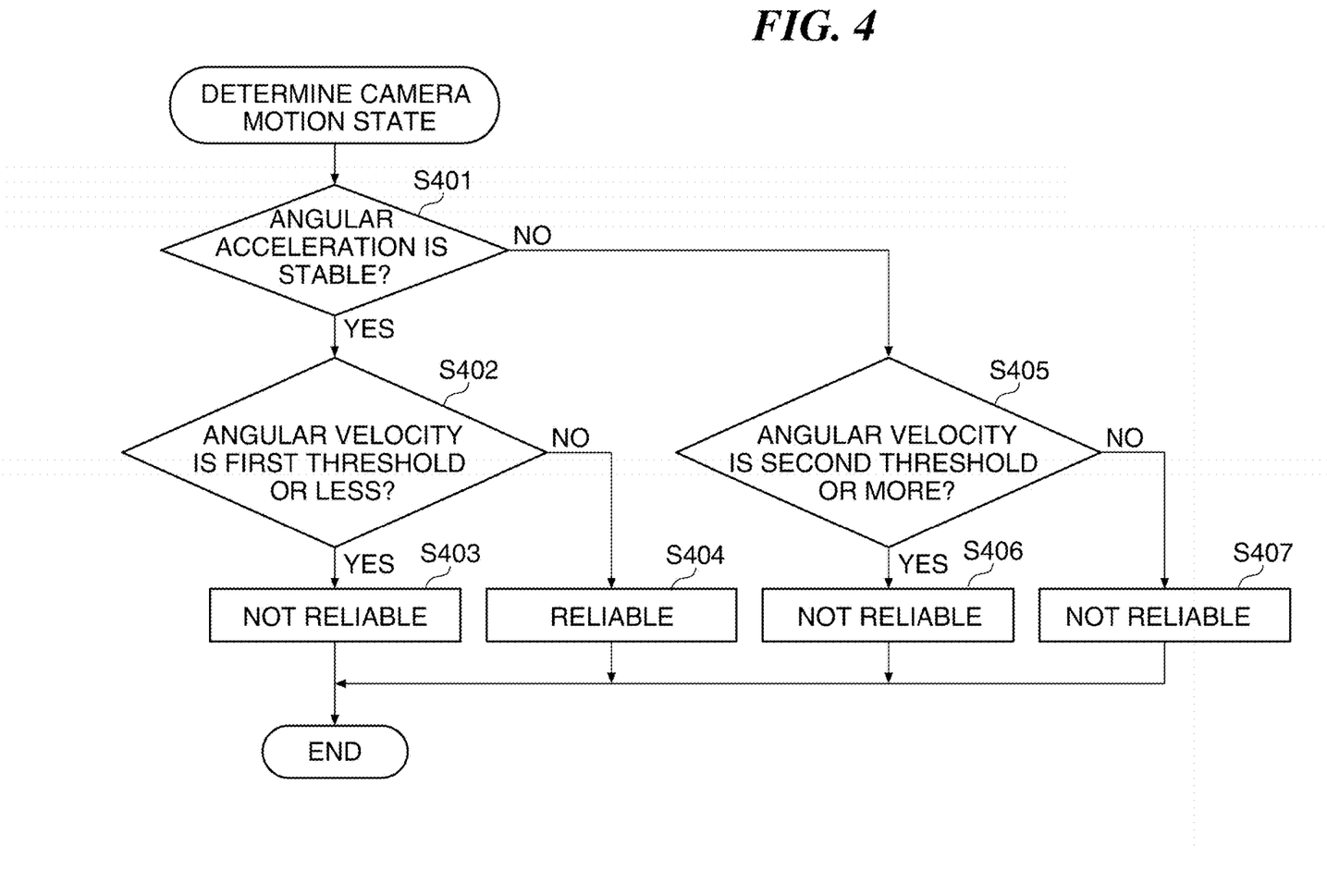
FIG. 4 is a flowchart of motion state determination processing in step S303.

The motion state determination processing in step S303 will be described below in detail. FIG. 4 is a flowchart of the motion state determination processing. In step S401, the control part 101 determines whether the angular acceleration output from the motion detection part 110 is stable while a plurality of images is being shot in step S301.

FIGS. 5A to 5D are the diagrams showing exemplary change patterns of angular velocity and angular acceleration output from the motion detection part 110. Herein, the motion states of the digital camera 100 are classified into four states by use of angular velocity and angular acceleration, which are shown in FIGS. 5A to 5D, respectively. In each of FIGS. 5A to 5D, a horizontal axis indicates a time-series shooting frame (time) and a vertical axis indicates an angular velocity and an angular acceleration relative to the shooting frame.

When a change in angular acceleration is large, it is assumed that a change in speed in the panning of the digital camera 100 is irregular. Thus, thresholds TH1 and TH2 are provided on the position (+) side and the negative (−) side of the values of the angular acceleration, respectively, and, when there is an image frame taking a value exceeding a range between the thresholds TH1 and TH2, it is determined that the angular velocity is not stable. The values of the thresholds TH1 and TH2 may be determined based on an experimental result.

Figure 5A:
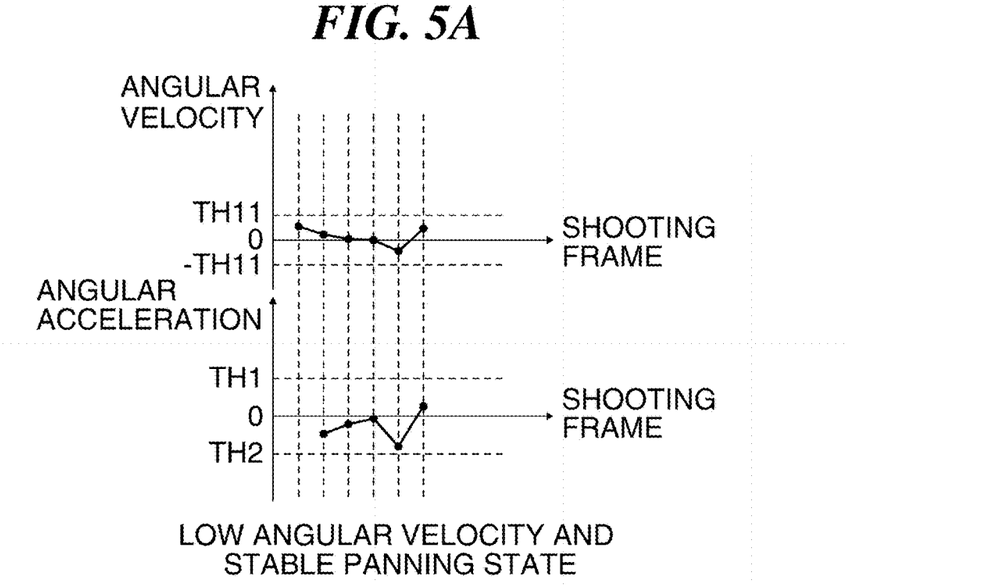
FIGS. 5A to 5D are diagrams showing exemplary change patterns of angular velocity and angular acceleration output from a motion detection part during shooting in step S301.
Figure 5B:
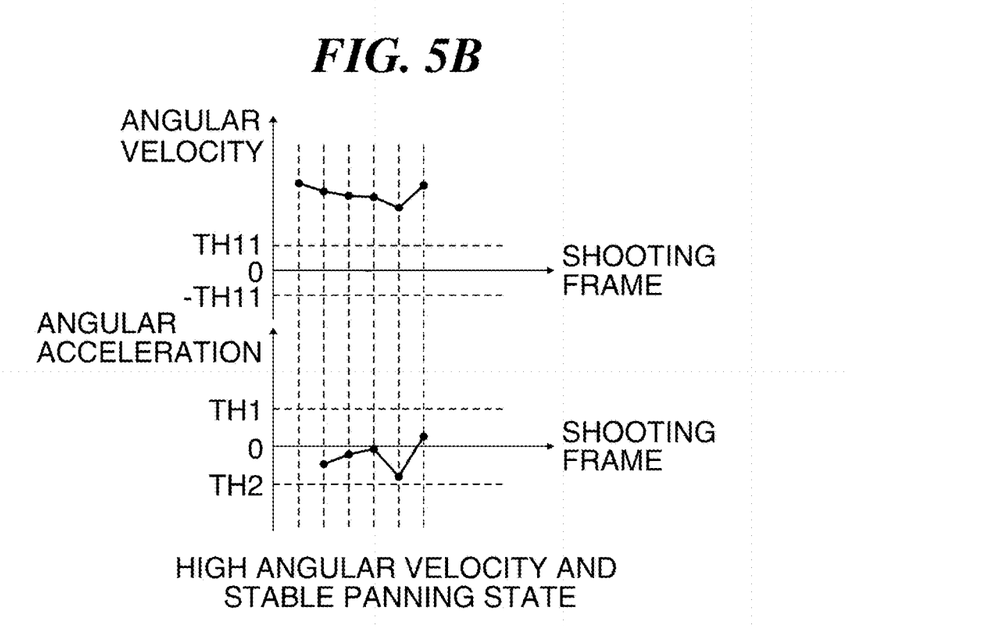
Figure 5C:
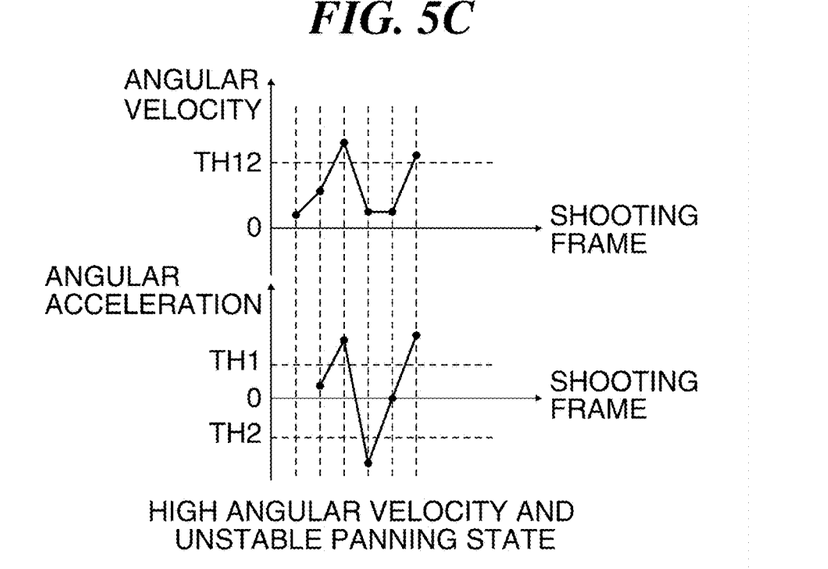
Figure 5D:
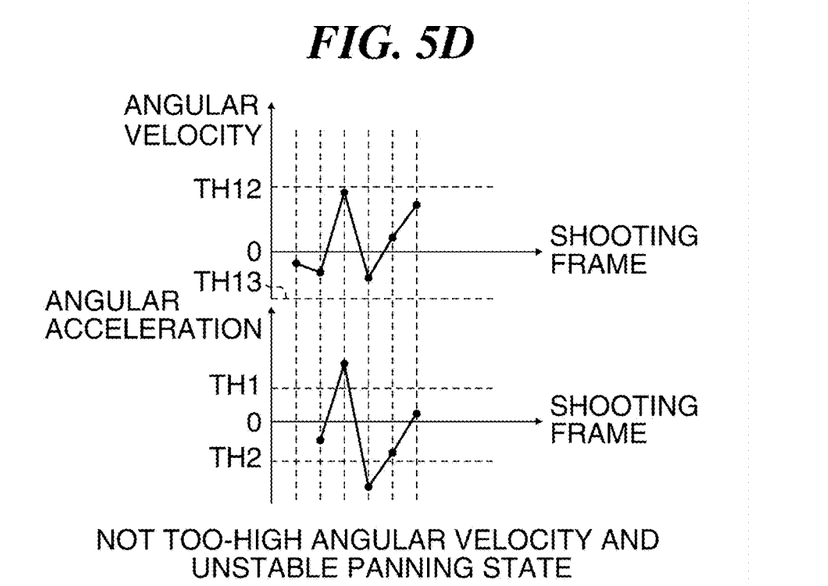

FIG. 5A shows an example in which the angular velocity during the panning is low and the angular acceleration is stable, and FIG. 5B shows an example in which the angular velocity during the panning is high and the angular acceleration is stable, and in either case, the panning operation is stable during the shooting. On the other hand, FIGS. 5C and 5D show the examples in which the angular acceleration is not stable and thus, the angular velocity during the panning is high or the panning operation during the shooting is not stable.

When the angular acceleration is stable (YES in step S401), the control part 101 proceeds to the processing in step S402, and, when the angular acceleration is not stable (NO in step S401), the control part 101 proceeds to the processing in step S405.

In step S402, the control part 101 determines whether an absolute value of the angular velocity output from the motion detection part 110 is a first threshold or less. That is, a determination is made as to whether the angular acceleration is stable and the state during the panning is almost still.

The determination in step S402 will be described with reference to FIGS. 5A and 5B. In FIGS. 5A and 5B, the first threshold TH11 is set for angular velocity. In FIG. 5A, the angular velocity falls within the range of ±TH11. When the panning is small in this way, for example, it is assumed that an effect of a user's hand shaking is largely expressed. Further, the output values from the motion detection part 110 are not stable in offset due to heat generated inside the digital camera 100 or effects of shooting environments. Therefore, when the signal value from the motion detection part 110 is low, it is assumed that the signal value from the motion detection part 110 is buried in offset fluctuation and an accuracy of the signal value from the motion detection part 110 is likely to be lowered. On the other hand, in FIG. 5B, the angular velocity is always higher than +TH11. In this case, unlike the above case, it can be determined that an accuracy of the signal value from the motion detection part 110 is not lowered.

Thus, when the absolute value of the angular velocity is the first threshold TH11 or less (YES in step S402), the control part 101 proceeds to the processing in step S403. In step S403, the control part 101 determines that the outputs (angular velocity and angular acceleration) from the motion detection part 110 are not reliable, and does not consider the camera motion information for the setting of the search position and the search range for searching a motion vector. On the other hand, when the absolute value of the angular velocity is greater than the first threshold TH11 (NO in step S402), the control part 101 proceeds to the processing in step S404. In step S404, the control part 101 determines that the outputs from the motion detection part 110 are reliable, and considers the camera motion information for the setting of the search position and the search range for searching a motion vector.

In step S405, the control part 101 determines whether there is an image frame for which the absolute value of the angular velocity output from the motion detection part 110 is a second threshold or more. The determination in step S405 will be described with reference to FIGS. 5C and 5D. In FIGS. 5C and 5D, the second threshold TH12 is set for the angular velocity. In FIG. 5C, there are image frames for which the angular velocity exceeds the second threshold TH12, while in FIG. 5D, there is no image frame for which the angular velocity exceeds the second threshold TH12.

When there is an image frame for which the angular velocity is the second threshold TH12 or more (YES in step S405), the control part 101 proceeds to the processing in step S406. In step S406, the control part 101 determines that the outputs from the motion detection part 110 are not reliable, and does not consider the camera motion information for the setting of the search position and the search range for searching a motion vector. On the other hand, when the angular velocity is less than the second threshold TH12 (NO in step S405), the control part 101 proceeds to the processing in step S407. In the step S407, the control part 101 determines that the outputs from the motion detection part 110 are not reliable, and does not consider the camera motion information for the setting of the search position and the search range for searching a motion vector.

It should be noted that according to the present embodiment, if it is determined that the value of the angular acceleration is not stable in step S401, the camera motion information is determined as not reliable irrespective of the determination result in step S405, and thus, the processing in step S405 seems to be unnecessary. The processing in steps S405 to S407 are provided, however, in order to perform different setting depending on the second threshold TH12 in step S304 subsequent to step S303. The description has been made herein assuming that one value is set for the second threshold TH12, but, as shown in FIG. 5D, the second threshold TH12 and a third threshold TH13 may be set on the + side and the − side of the angular velocity, respectively. In this case, in step S405, a determination is made as to whether the angular velocities of all the image frames are between the second threshold TH12 and the third threshold TH13, and the processing proceeds to step S406 when the angular velocities are not therebetween, and the processing proceeds to step S407 when the angular velocities are therebetween.

The control part 101 makes a determination in any of steps S403, S404, S406, and S407, and then terminates the present processing and proceeds to the processing in step S304.

The processing of setting a search position and a search range for the motion vector between images in step S304 will be described below in detail. The setting for searching a motion vector is controlled by use of the camera motion state determination result in step S303. The determination that the camera motion information is reliable in the camera motion state determination in step S303 is defined as a basic state, and the method for setting a position and a range for searching a motion vector in a basis state will be described with reference to FIGS. 6A and 6B.

Figure 6A:
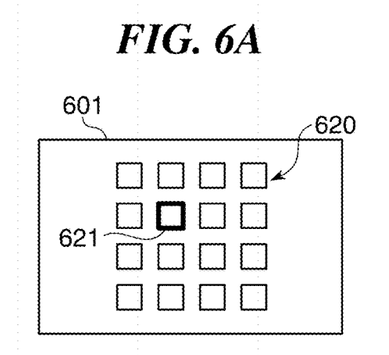
FIGS. 6A and 6B are diagrams schematically showing a method for setting a search position and a search range for the motion vector in step S304 in a basic state.
Figure 6B:
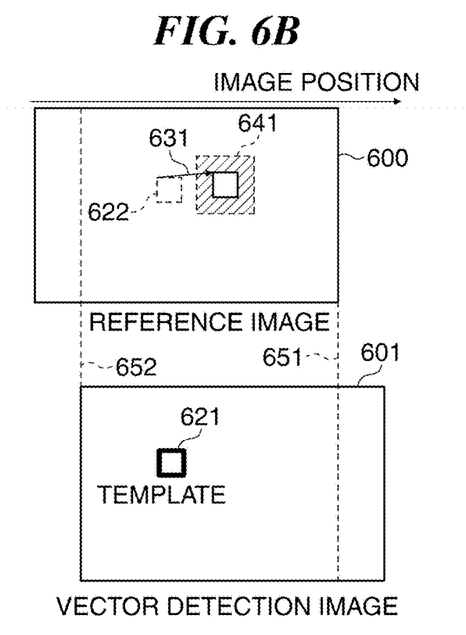

FIGS. 6A and 6B are diagrams schematically showing the method for setting a search position and a search range for the motion vector in the basis state. FIG. 6A is a diagram for explaining a template position for searching a motion vector. In the template matching system, a small-area image called a template image is determined from either the reference image or the vector detection image from which a motion vector is to be detected in order to detect a moving amount of the subject. FIG. 6A shows a group of template images 620 arranged at equal intervals in a vector detection image 601, where one of the group of template images 620 is assumed as template image 621 for convenient description.

FIG. 6B is a diagram for explaining corresponding areas between a reference image 600 and the vector detection image 601. It is assumed that the same subject is shot in the reference image 600 and the vector detection image 601 between a broken line 651 and a broken line 652.

A position of an area of the template image 621 determined in the vector detection image 601 is assumed as a start point (default setting value of the search position for calculating a motion vector). A position where the template image 622 corresponding to the template image 621 in the vector detection image 601 is moved by the camera motion information as offset 631 is assumed as a motion vector search start position in the reference image 600. A vector search range 641 around the search start position (default setting value of the search range for calculating a motion vector) is compared with the template image 621, and a positional offset between a high-correlation position and the template image 621 is detected as a motion vector. The operation is performed on all the areas in the group of template images 620, and as many motion vectors as the group of template images 620 are detected.

Herein, the camera motion information is the angular velocity and the angular acceleration as output values from the motion detection part 110, and the output values need to be converted into a moving amount on an image, and the following expression 1 can be used for the conversion, for example. The following expression 1 is used for finding a moving amount on an image by finding a motion angle based on the angular velocity output from the motion detection part 110 and dividing it by a pixel pitch.

Mathematical expression 1:

$$\text{Moving amount} = \frac{f\left(-\frac{\omega}{fps}\right)}{pp},$$

where f is a focal distance in mm, ω is an angular velocity in rad/sec, fps is a frame rate in frame/sec, and pp is a pixel pitch in mm/pixel.

It should be noted that the method for finding a moving amount on an image is not limited to the method described above. For example, if an angle of view is known, an evaluation value, which is obtained by multiplying the angular velocity and the angle of view output at each sampling cycle between an exposure (charge accumulation on the image pickup device) start timing and an exposure end timing in the image pickup part 105, is divided by the pixel pitch to thereby find the moving amount on the image.

Subsequently, a method for controlling setting of a search position and a search range for a motion vector will be described with reference to FIGS. 5A to 7D. FIGS. 7A to 7D are the diagrams for explaining a method for setting a search position and a search range for a motion vector relative to the output values (angular velocity and angular acceleration) from the motion detection part 110 of FIGS. 5A to 5D, respectively.

Figure 7A:
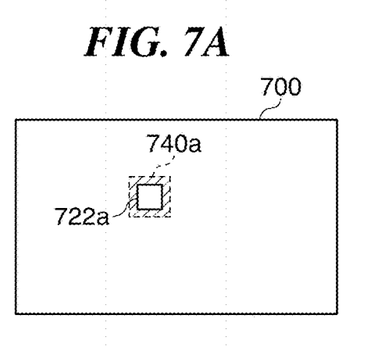
FIGS. 7A to 7D are diagrams for explaining the method for setting a search position and a search range for a motion vector relative to output values from the motion detection part of FIGS. 5A to 5D.

When the output values from the motion detection part 110 are as shown in FIG. 5A, a motion vector search position is set as shown in FIG. 7A, where a search start position 722a and a vector search range 740a are set in a reference image 700. The search start position 722a does not use the camera motion information as offset, and thus, is set at the same position as the template image 621 (see FIGS. 6A and 6B) in the vector detection image 601. Further, the vector search range 740a is set to be narrower than the search range in the basis state shown in FIG. 6B.

Figure 7B:
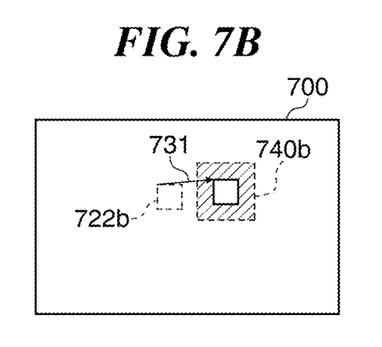

When the output values from the motion detection part 110 are as shown in FIG. 5B, a motion vector search position is set as shown in FIG. 7B, where a search start position 722b and a vector search range 740b are set in the reference image 700. FIG. 7B is equivalent to FIG. 6B. The search start position 722b corresponds to the template image 622, an amount of an offset 731 as the camera motion information corresponds to an amount of the offset 631 as the camera motion information, and the vector search range 740b corresponds to the vector search range 641. As described with reference to FIG. 6B, the motion vector search start position is where the search start position 722b is moved by the offset 731.

Figure 7C:
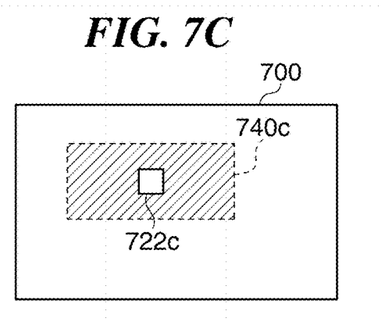

When the output values from the motion detection part 110 are as shown in FIG. 5C, a motion vector search position is set as shown in FIG. 7C, where a search start position 722c and a vector search range 740c are set in the reference image 700. The search start position 722c is the same as the search start position 722a in FIG. 7A. The vector search range 740c is set to be wider than the vector search range 740b in the basic state shown in FIG. 7B and a vector search range 740d shown in FIG. 7D.

Figure 7D:
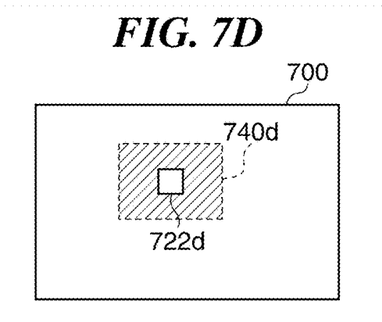

When the output values from the motion detection part 110 are as shown in FIG. 5D, a motion vector search position is set as shown in FIG. 7D, where a search start position 722d and the vector search range 740d are set in the reference image 700. The search start position 722d is the same as the search start position 722a in FIG. 7A. The vector search range 740d is set to be narrower than the vector search range 740c shown in FIG. 7C but wider than the vector search range 740b in the basic state shown in FIG. 7B.

It should be noted that the vector search ranges 740a to 740d in FIGS. 7A to 7D, respectively, are experimentally determined depending on a sensor size of the image pickup part 105 (image pickup device) in the digital camera 100, a focal distance, the number of pixels, an angle between images during panning, and an image size of a template. For example, it is assumed that the image pickup device is advanced photo system type-C (APS-C) size, the focal distance is 18 mm, the angle of panning per image is 2.5 degrees, the resolution is 200,000 pixels, and the template image size is 256×256 pixels. In this case, it is roughly assumed that the vector search range 740a is 64 pixels×64 pixels, the vector search range 740b is 128 pixels×128 pixels, the vector search range 740c is 512 pixels×512 pixels, and the vector search range 740d is 256 pixels×256 pixels.

As described above, according to the present embodiment, a determination is made as to whether the motion information of the digital camera 100 detected by the motion detection part 110 is reliable, and a search range or a search start position for detecting a motion vector is changed to thereby appropriately detect a vector. By this arrangement, even when the motion information of the digital camera 100 cannot be correctly measured due to heat generated in the digital camera 100 or a user operation of the digital camera 100, a correct motion between image frames can be detected. Therefore, a natural panning shot image can be synthesized from a plurality of images acquired by panning shooting.

A panning shot image synthesizing processing by so called panning has been described according to the first embodiment. According a second embodiment, however, there will be described processing of continuously shooting a plurality of images by panning the digital camera 100 to thereby generate a wide-angle image from the composite shot images by use of the configuration of determining a search position and a search range for a motion vector described according to the first embodiment.

Figure 8:
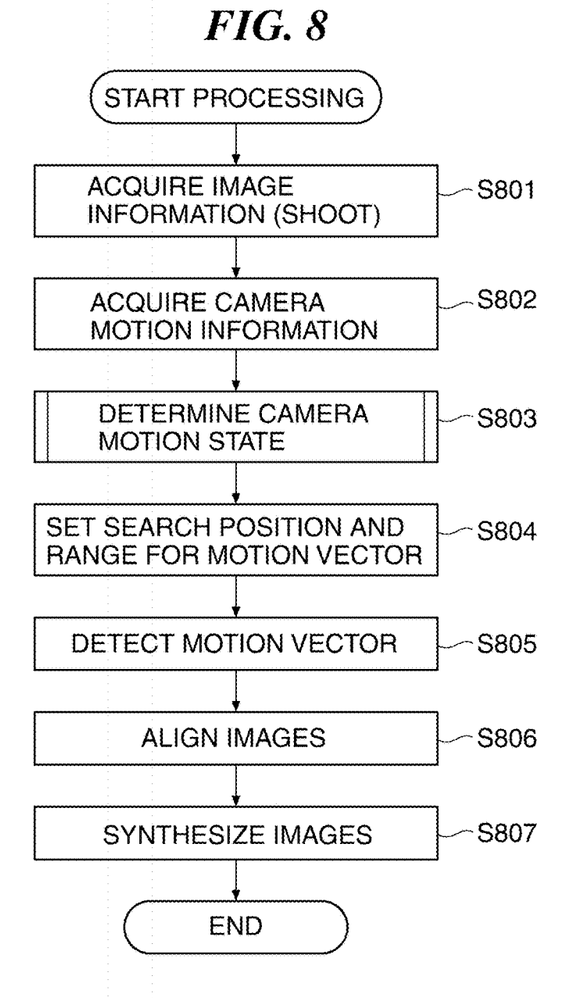
FIG. 8 is a flowchart of wide-angle image synthesizing processing by the digital camera shown in FIG. 1.

FIG. 8 is a flowchart of a wide-angle image synthesizing processing by the digital camera 100. The control part 101 develops predetermined programs read from the ROM 102 on the RAM 103 to control the operations or processing of each part configuring the digital camera 100 so that the processing in each step in FIG. 8 is realized.

Figure 9A:
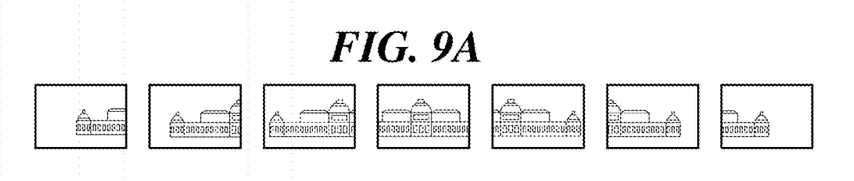
FIGS. 9A and 9B are diagrams of a plurality of images shot in step S801, and a wide-angle image of the composite images, respectively.

The processing in steps S801 to S805 are the same as the processing in the steps S301 to S305 in the flowchart of FIG. 3, and thus, the description thereof will be omitted herein. It should be noted that a plurality of exemplary images shot in step S801 are shown in FIG. 9A.

Figure 10:
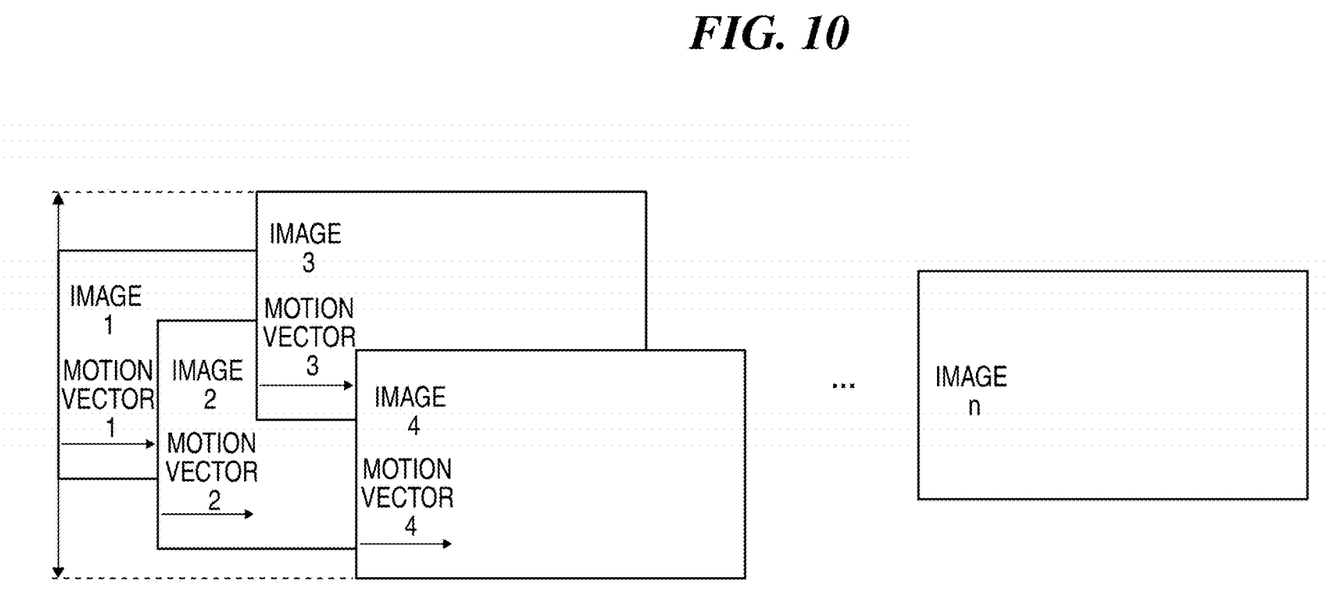
FIG. 10 is a diagram for schematically explaining processing of aligning a plurality of images in step S806.

In step S806, the control part 101 aligns a plurality of images (FIG. 9A) shot by the panning shooting (step S801) in order of shooting by use of the motion vectors detected in the processing in step S805. FIG. 10 is a diagram for schematically explaining the processing of aligning a plurality of images. With the alignment processing, positions of a subject are aligned between an n-th image (image n) and an n+1-th image (image n+1) based on a motion vector n (where n is a natural number). The alignment processing may employ a well-known geometric transformation processing, such as translation motion, affine transformation, and projective transformation.

Figure 9B:
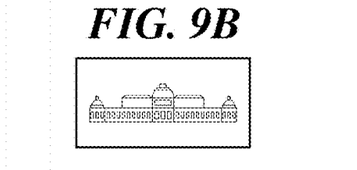
Figure 11:
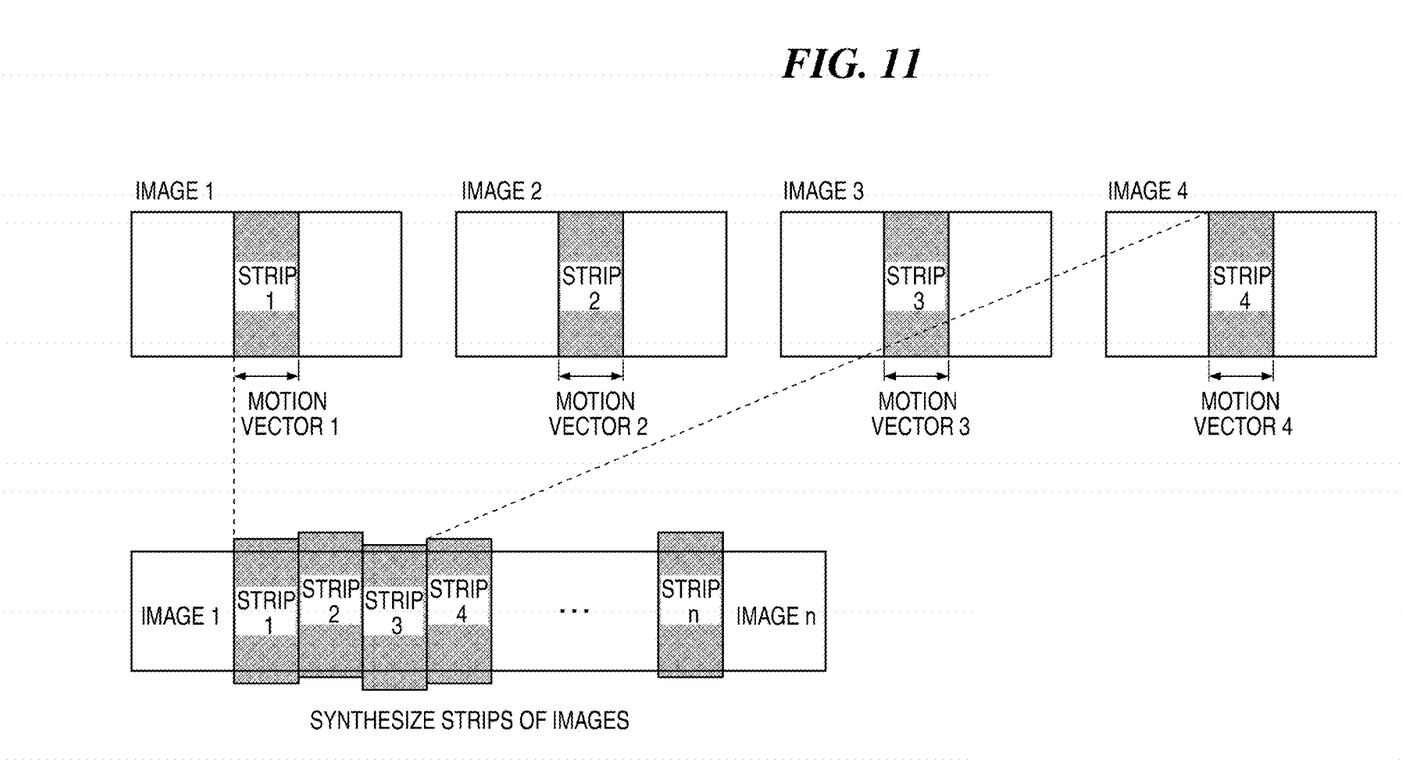
FIG. 11 is a diagram for schematically explaining processing of synthesizing boundaries of a plurality of images in step S807.

In step S807, the control part 101 performs processing of synthesizing boundaries of the images aligned in step S806. FIG. 11 is a diagram for schematically explaining the processing of synthesizing the boundaries of images. When the boundaries of images are combined, a strip n, as an area corresponding to the motion vector n as an area used for synthesis, is cut out from an aligned image n, and the strips n are combined to thereby generate a composite wide-angle image. The thus-synthesized final wide-angle image is shown in FIG. 9B.

As described above, according to the present embodiment, a naturally-synthesized wide-angle image can be generated from a plurality of images acquired by panning shooting by use of the configuration of determining a search position and a search range for a motion vector described according to the first embodiment.

It should be noted that the processing of synthesizing flow shot images and a wide-angle image by the panning of the digital camera 100 have been described according to the above embodiments, and images can be synthesized by the tilting (tilt operation) of the digital camera 100 with the similar processing. Further, the present invention is applicable when the motion of the digital camera 100 is continuous, but a motion direction thereof is changed depending on motion of a main subject, like when a main subject, such as airplane, is panned.

Other Embodiments

Embodiments of the present invention can also be realized by a computer of a system or an apparatus that reads out and executes computer executable instructions (e.g., one or more programs) recorded on a storage medium (that may also be referred to more fully as a 'non-transitory computer-readable storage medium') to perform the functions of one or more of the above-described embodiments and/or that includes one or more circuits (e.g., an application specific integrated circuit (ASIC)) for performing the functions of one or more of the above-described embodiments, and by a method performed by the computer of the system or the apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image pickup apparatus comprising:
   (A) an image pickup sensor;
   (B) at least one memory configured to store instructions; and
   (C) at least one processor in communication with the at least one memory and configured to execute the instructions:
     (a) to detect motion information of said image pickup sensor when a plurality of images is continuously shot while said image pickup sensor is being moved in a predetermined direction;
     (b) to calculate a motion vector indicating a moving amount of a subject between the plurality of images shot by said image pickup sensor, by changing a search position for calculating the motion vector from a default setting value based on the motion information of said image pickup sensor; and
     (c) to align and to synthesize the plurality of shot images to thereby generate a composite image based on the motion vectors.

2. The image pickup apparatus according to claim 1, wherein that at least one processor further executes the instructions:
(d) to extract a main subject area from a background area in the plurality of images, respectively, based on an area in which the motion vector is similar to the detected motion information of said image pickup sensor as the background area in the plurality of images shot by said image pickup sensor; and
(e) to align the positions of the main subject area in the plurality of images and to perform filtering processing on the background area to thereby generate the composite image.

3. The image pickup apparatus according to claim 1, wherein the at least one processor further executes the instructions (d) to align the plurality of images shot by said image pickup sensor in order of shooting to thereby generate a composite wide-angle image, and
wherein the at least one processor calculates the motion vector as a vector indicating the moving amount of the subject in order to align the positions of the subject between an n-th image and an n+1-th image shot by said image pickup sensor, where n is a natural number.

4. The image pickup apparatus according to claim 1, wherein a motion of said image pickup sensor when said image pickup sensor continuously shoots the plurality of images is a motion to pan or to tilt said image pickup sensor.

5. The image pickup apparatus according to claim 1, wherein the at least one processor further executes the instructions (d) to detect an angular velocity and an angular acceleration of said image pickup sensor as motion information of said image pickup sensor, and
wherein the at least one processor calculates the motion vector without considering the motion information of said image pickup sensor for determining the search position when a value of the angular acceleration detected for frames of the plurality of images is within a predetermined range and the angular velocity detected for the frames of the plurality of images is a first threshold or less.

6. The image pickup apparatus according to claim 1, wherein the at least one processor further executes the instructions (d) to detect an angular velocity and an angular acceleration of said image pickup sensor as motion information of said image pickup sensor, and
wherein the at least one processor calculates the motion vector by considering the motion information of said image pickup sensor for determining the search position when a value of the angular acceleration detected for frames of the plurality of images is within a predetermined range and the angular velocity detected for the frames of the plurality of images is greater than a first threshold.

7. The image pickup apparatus according to claim 1, wherein the at least one processor further executes the instructions (d) to detect an angular velocity and an angular acceleration of said image pickup sensor as motion information of said image pickup sensor, and
wherein the at least one processor calculates the motion vector without considering the motion information of said image pickup sensor for determining the search position when a value of the angular acceleration detected for frames of the plurality of images is not within a predetermined range.

8. A method of controlling an image pickup apparatus, the method comprising:
a shooting step of continuously shooting a plurality of images while moving an image pickup sensor in a predetermined direction;
a detection step of detecting motion of the image pickup sensor in said shooting step;
a calculation step of calculating a motion vector indicating a moving amount of a subject between the plurality of images shot by the image pickup sensor, by changing a search position for calculating the motion vector from a default setting value based on the motion information of the image pickup sensor; and
an aligning and synthesizing step of aligning and synthesizing the plurality of shot images to thereby generate a composite image based on the motion vectors calculated in said calculation step.

9. A computer readable non-transitory storage medium storing a program for causing a computer to execute a control method for controlling an image pickup apparatus, the control method comprising:
a detection step of detecting motion of an image pickup sensor when continuously shooting a plurality of images while moving the image pickup sensor in a predetermined direction;
a calculation step of calculating a motion vector indicating a moving amount of a subject between the plurality of images shot by the image pickup sensor, by changing a search position for calculating the motion vector from a default setting value based on the motion information of the image pickup sensor; and
an aligning and synthesizing step of aligning and synthesizing the plurality of shot images thereby to generate a composite image based on the motion vectors calculated in said calculation step.

10. The image pickup apparatus according to claim 1, wherein the at least one processor calculates the motion vector without changing a search range for calculating the motion vector.

11. The image pickup apparatus according to claim 1, wherein the at least one processor calculates the motion vector by changing the search range for calculating the motion vector from the default setting value based on motion information of the image pickup sensor.

12. The image pickup apparatus according to claim 11, wherein the at least one processor further executes the instructions (d) to detect an angular velocity and an angular acceleration of said image pickup sensor as the motion information of said image pickup sensor, and
wherein the at least one processor calculates the motion vector without considering the motion information of said image pickup sensor for determining the search range when a value of the angular acceleration detected from frames of the plurality of images is within a predetermined range and the angular velocity detected for the frames of the plurality of images is a first threshold or less.

13. The image pickup apparatus according to claim 12, wherein the at least one processor calculates the motion vector without considering the motion information of said image pickup sensor for determining the search position and the search range when the value of the angular acceleration detected for the frames of the plurality of images is within a predetermined range and the angular velocity detected for the frames of the plurality of images is the first threshold or less, and calculates the motion vector by using the default setting value for the search position and by setting the search range to be narrower than the default setting value.

14. The image pickup apparatus according to claim 11, wherein the at least one processor further executes the instructions (d) to detect an angular velocity and an angular acceleration of said image pickup sensor as the motion information of said image pickup sensor, and wherein the at least one processor calculates the motion vector by considering the motion information of said image pickup sensor for determining the search range when a value of the angular acceleration detected for frames of the plurality of images is within a predetermined range and the angular velocity detected for the frames of the plurality of images is greater than a first threshold.

15. The image pickup apparatus according to claim 14, wherein the at least one processor calculates the motion vector by considering the motion information of said image pickup sensor for determining the search position and the search range when the value of the angular acceleration detected for the frames of the plurality of images is within the predetermined range and the angular velocity detected for the frames of the plurality of images is greater than the first threshold, and calculates the motion vector by setting the default setting value as the search position and setting the search range to be narrower than the default setting value.

16. The image pickup apparatus according to claim 11, wherein the at least one processor further executes the instructions (d) to detect an angular velocity and an angular acceleration of said image pickup sensor as the motion information of said image pickup sensor, and wherein the at least one processor calculates the motion vector without considering the motion information of said image pickup sensor for determining the search range when a value of the angular acceleration detected for frames of the plurality of images is not within a predetermined range.

17. The image pickup apparatus according to claim 16, wherein the at least one processor calculates the motion vector without considering the motion information of said image pickup sensor for determining the search position and the search range when the value of the angular acceleration detected for the frames of the plurality of images is not within the predetermined range, and calculates the motion vector by using the default setting value for the search position and setting the search range to be wider than the default setting value when the angular velocity detected for the frames of the plurality of images is a second threshold or greater.

18. The image pickup apparatus according to claim 16, wherein the at least one processor calculates the motion vector without considering the motion information of said image pickup sensor for determining the search position and the search range when the value of the angular acceleration detected for the frames of the plurality of images is not within the predetermined range, and, when the angular velocity detected for the frames of the plurality of images is less than a second threshold, the at least one processor calculates the motion vector by using the default setting value for the search position and setting the search range to be wider than the default setting value and narrower than the search range set when the angular velocity is the second threshold or more.

* * * * *